United States Patent
Chen et al.

(10) Patent No.: US 12,133,117 B2
(45) Date of Patent: Oct. 29, 2024

(54) METHOD FOR COMMUNICATION BETWEEN WIRELESS EARPHONE AND CHARGING CASE, CHARGING CASE, TWS EARPHONE, AND SYSTEM

(71) Applicant: GOERTEK INC., Shandong (CN)

(72) Inventors: Qiang Chen, Shandong (CN); Pei Yang, Shandong (CN)

(73) Assignee: GOERTEK INC., Weifang (CN)

( * ) Notice: Subject to any disclaimer, the term of this patent is extended or adjusted under 35 U.S.C. 154(b) by 167 days.

(21) Appl. No.: 17/766,788

(22) PCT Filed: Dec. 28, 2019

(86) PCT No.: PCT/CN2019/129580
§ 371 (c)(1),
(2) Date: Apr. 6, 2022

(87) PCT Pub. No.: WO2021/082263
PCT Pub. Date: May 6, 2021

(65) Prior Publication Data
US 2023/0403607 A1    Dec. 14, 2023

(30) Foreign Application Priority Data
Oct. 31, 2019   (CN) .......................... 201911055264.6

(51) Int. Cl.
*H04W 4/00*        (2018.01)
*H04R 1/10*        (2006.01)
(Continued)

(52) U.S. Cl.
CPC .......... *H04W 28/18* (2013.01); *H04R 1/1025* (2013.01); *H04W 48/16* (2013.01)

(58) Field of Classification Search
CPC ..... H04W 28/18; H04W 48/16; H04W 28/04; H04W 72/04; H04W 72/042;
(Continued)

(56) References Cited

U.S. PATENT DOCUMENTS 1,812,214 A  *  6/1931  Mix ...................... A44B 11/008
10,412,567 B1 *  9/2019  Tong ...................... H04W 76/10
(Continued)

FOREIGN PATENT DOCUMENTS

| CN | 105635873 | 6/2016 |
| CN | 209072692 | 7/2019 |
| CN | 110166871 | 8/2019 |

OTHER PUBLICATIONS

International Search Report issued in PCT/CN2019/129580 dated Jul. 30, 2020.

*Primary Examiner* — Phuongchau Ba Nguyen
(74) *Attorney, Agent, or Firm* — HAUPTMAN HAM, LLP (57) ABSTRACT

A method for communicating between a wireless earphone and a charging case, a charging case, a TWS earphone and a TWS earphone system are provided. In the method, in response to a case opening signal, the earphone case I/O controlling module is controlled to set an operation attribute of the first I/O interface as a communication interface. A predetermined negotiation signal is transmitted to the wireless earphone via the first I/O interface. It is determined whether a negotiation confirmation signal corresponding to the predetermined negotiation signal is received from the wireless earphone via the first I/O interface. In a case that the negotiation confirmation signal corresponding to the predetermined negotiation signal is received from the wireless earphone via the first I/O interface, the charging case enters into a communication mode for communicating with the wireless earphone.

10 Claims, 2 Drawing Sheets

(51) Int. Cl.
*H04W 28/18* (2009.01)
*H04W 48/16* (2009.01)

(58) Field of Classification Search
CPC ... H04W 88/08; H04W 28/08; H04W 28/084; H04W 36/22; H04W 72/12; H04R 1/1025; H04R 3/00; A45C 11/00; A45C 2011/001; H04L 5/0007
See application file for complete search history.

(56) References Cited

U.S. PATENT DOCUMENTS

| | | | |
|---|---|---|---|
| 11,856,354 B2* | 12/2023 | Liu | H04R 1/1025 |
| 11,985,468 B2* | 5/2024 | Yang | H04R 1/1041 |
| 2017/0201945 A1 | 7/2017 | Chae et al. | |
| 2019/0075385 A1* | 3/2019 | Lee | H02J 7/0045 |
| 2021/0006889 A1* | 1/2021 | Geng | H04R 1/1016 |
| 2022/0329928 A1* | 10/2022 | Bai | H04R 1/1041 |
| 2023/0224624 A1* | 7/2023 | Takahashi | H04R 1/1041 |

* cited by examiner

METHOD FOR COMMUNICATION BETWEEN WIRELESS EARPHONE AND CHARGING CASE, CHARGING CASE, TWS EARPHONE, AND SYSTEM

This application is a 371 application of International Patent Application No. PCT/CN2019/129580, titled "METHOD FOR COMMUNICATION BETWEEN WIRELESS EARPHONE AND CHARGING CASE, CHARGING CASE, TWS EARPHONE, AND SYSTEM", filed on Dec. 28, 2019, which claims the benefit of and priority to Chinese Patent Application No. 201911055264.6, titled "METHOD FOR COMMUNICATION BETWEEN WIRELESS EARPHONE AND CHARGING CASE, CHARGING CASE, TWS EARPHONE, AND SYSTEM", filed on Oct. 31, 2019 with the Chinese Patent Office, which are incorporated herein by reference in their entireties.

FIELD

The present disclosure relates to the technical field of earphone communication, and in particular to a method for communicating between a wireless earphone and a charging case, a charging case, a TWS earphone and a TWS earphone system.

BACKGROUND

Wireless earphones are widely used due to the advantages of wirelessness and handiness. TWS earphones are generally used with a charging case due to the problems of small battery capacity and short standby time. In order to reduce the number of contact interfaces between an earphone case and a wireless earphone, the charging interface and the communication interface of the earphone case and the wireless earphone are multiplexed on one contact interface according to the conventional technology. However, in the case that the contact interface serves as the communication interface, the communication reliability is low.

SUMMARY

A method for communicating between a wireless earphone and a charging case, a charging case, a TWS earphone and a TWS earphone system are provided according to the present disclosure. With the method according to the present disclosure, an interactive confirmation process is performed before the communication between the charging case and the wireless earphone, improving the reliability of the communication between the charging case and the wireless earphone.

In order to solve the above technical problems, a method for communicating between a wireless earphone and a charging case is provided according to present disclosure. The charging case includes a first processor, an earphone case I/O controlling module and a first I/O interface. The method is applied to the first processor. The method includes:
controlling, in response to a case opening signal, the earphone case I/O controlling module to set an operation attribute of the first I/O interface as a communication interface;
transmitting a predetermined negotiation signal to the wireless earphone via the first I/O interface;
determining whether a negotiation confirmation signal corresponding to the predetermined negotiation signal is received from the wireless earphone via the first I/O interface; and
controlling the charging case to enter into a communication mode for communicating with the wireless earphone in a case that the negotiation confirmation signal corresponding to the predetermined negotiation signal is received from the wireless earphone via the first I/O interface.

In an embodiment, before transmitting the predetermined negotiation signal to the wireless earphone via the first I/O interface, the method further includes:
transmitting an interrupt triggering signal to the wireless earphone via the first I/O interface to control the wireless earphone to close interrupt until transmitting the negotiation confirmation signal.

In an embodiment, after controlling the charging case to enter into the communication mode for communicating with the wireless earphone, the method further includes:
transmitting, in response to a case closing signal, a case closing message to the wireless earphone via the first I/O interface to control the wireless earphone to enter into a charging mode; and
controlling the earphone case I/O controlling module to set the operation attribute of the first I/O interface as a charging interface to control the charging case to enter into the charging mode for charging the wireless earphone.

In an embodiment, before transmitting the predetermined negotiation signal to the wireless earphone via the first I/O interface, the method further includes:
switching an interface, arranged in the first processor and used for communicating with the wireless earphone, from a TX port to a general-purpose input/output (GPIO) interface; and
before controlling the charging case to enter into the communication mode for communicating with the wireless earphone, the method further includes: switching the interface, arranged in the first processor and used for communicating with the wireless earphone, from the GPIO interface to the TX port.

In order to solve the above technical problems, a method for communicating between a wireless earphone and a charging case is further provided according to the present disclosure. The wireless earphone includes a second processor, an earphone I/O controlling module, a second I/O interface, and a third I/O interface connected to the second I/O interface. The method is applied to the second processor. The method includes:
receiving, via the third I/O interface, a predetermined negotiation signal transmitted via a first I/O interface by the charging case;
determining whether the predetermined negotiation signal meets a predetermined negotiation requirement; and
in a case that that the predetermined negotiation signal meets the predetermined negotiation requirement, transmitting a negotiation confirmation signal corresponding to the predetermined negotiation signal via the third I/O interface, and then controlling the earphone I/O controlling module to set an operation attribute of the second I/O interface as a communication interface to control the wireless earphone to enter into a communication mode for communicating with the charging case.

In an embodiment, before receiving, via the third I/O interface, the predetermined negotiation signal transmitted via the first I/O interface by the charging case, the method further includes:
receiving an interrupt triggering signal via the third I/O interface from the charging case; and closing interrupt until transmitting the negotiation confirmation signal.

In an embodiment, after controlling the wireless earphone to enter into the communication mode for communicating with the charging case, the method further includes:

receiving a case closing message via the second I/O interface from the charging case; and controlling the earphone I/O controlling module to set the operation attribute of the second I/O interface as a charging interface to control the wireless earphone to enter into a charging mode.

In order to solve the above technical problems, a charging case is further provided according to the present disclosure. The charging case includes a first processor, an earphone case I/O controlling module and a first I/O interface. The first processor is configured to execute a computer program to perform the method for communicating between a wireless earphone and a charging case.

In order to solve the above technical problems, a TWS earphone is further provided according to the present disclosure. The TWS earphone includes a second processor, an earphone I/O controlling module, a second I/O interface, and a third I/O interface connected to the second I/O interface. The second processor is configured to execute a computer program to perform the method for communicating between a wireless earphone and a charging case.

In order to solve the above technical problems, a TWS earphone system is further provided according to the present disclosure. The TWS earphone system includes the charging case and the TWS earphone.

A method for communicating between a wireless earphone and a charging case is provided according to the present disclosure. In the method, the operation attribute of the first I/O interface is set based on the open-close state of the charging case. Specifically, when the charging case is opened, the operation attribute of the first I/O interface is set as a communication interface. Before communicating with the wireless earphone, the charging case transmits a predetermined negotiation signal to the wireless earphone. The charging case enters into a communication mode to communicate with the wireless earphone only after receiving a negotiation confirmation signal corresponding to the predetermined negotiation signal from the wireless earphone. Therefore, with the method according to the present disclosure, an interactive confirmation process is performed before the communication between the charging case and the wireless earphone, thereby improving the reliability of the communication between the charging case and the wireless earphone.

A charging case, a TWS wireless earphone and a TWS wireless earphone system are further provided according to the present disclosure, achieving the same beneficial effect as the effect achieved with the method for communicating between a wireless earphone and a charging case.

BRIEF DESCRIPTION OF THE DINITIALINGS

In order to more clearly illustrate technical solutions in embodiments of the present disclosure, the drawings to be used in the conventional technology or the embodiments are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

A method for communicating between a wireless earphone and a charging case, a charging case, a TWS earphone and a TWS earphone system are provided according to the present disclosure. According to the present disclosure, an interactive confirmation process is performed before the communication between the charging case and the wireless earphone, improving the reliability of the communication between the charging case and the wireless earphone.

In order to make objects, technical solutions and advantages of the present disclosure clearer, the technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

Figure 1:
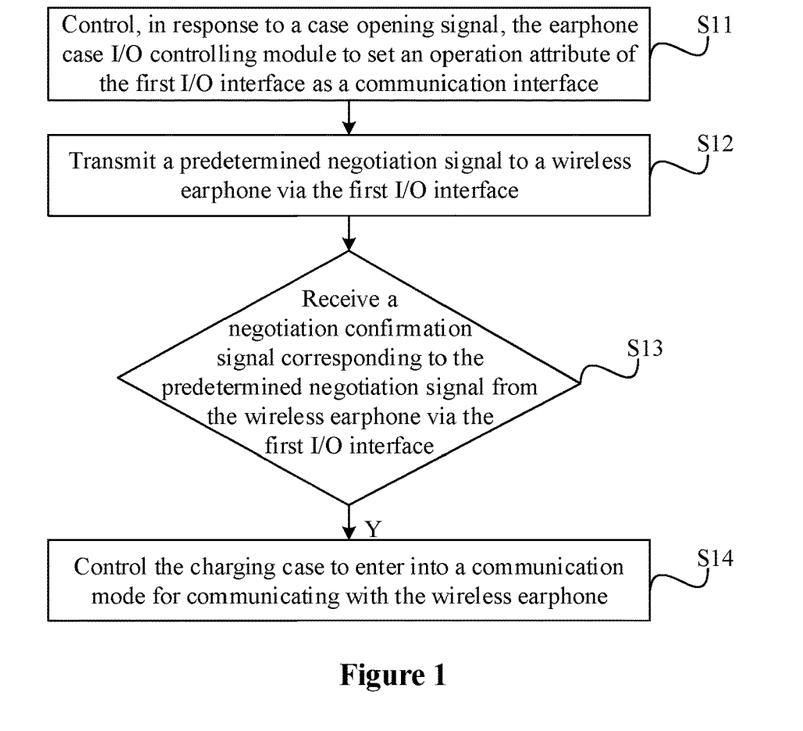
FIG. 1 is a flow chart of a method for communicating between a wireless earphone and a charging case according to an embodiment of the present disclosure.

Reference is made to FIG. 1, which is a flow chart of a method for communicating between a wireless earphone and a charging case according to the present disclosure.

The charging case includes a first processor, an earphone case I/O controlling module and a first I/O interface. The method is applied to the first processor. The method includes the following steps S11 to S14.

In step S11, the earphone case I/O controlling module is controlled to set an operation attribute of the first I/O interface as a communication interface in response to a case opening signal.

In step S12, a predetermined negotiation signal is transmitted to the wireless earphone via the first I/O interface.

In step S13, it is determined whether a negotiation confirmation signal corresponding to the predetermined negotiation signal is received from the wireless earphone via the first I/O interface. In a case that the negotiation confirmation signal corresponding to the predetermined negotiation signal is received from the wireless earphone via the first I/O interface, proceed to step S14.

In step S14, the charging case enters into a communication mode for communicating with the wireless earphone.

It should be noted that in the present disclosure, a method for communicating between a master earphone in wireless earphones and a charging case is the same as a method for communicating between a slave earphone in the wireless earphones and the charging case. Therefore, the wireless earphone in the above steps may be the master earphone in the wireless earphones or the slave earphone in the wireless earphones.

In the present disclosure, the charging case may be opened and closed. In a case that the charging case is opened, it indicates that the user needs to use the wireless earphone and it is required to perform communication between the charging case and the wireless earphone. In a case that the charging case is closed, it indicates that the wireless earphone needs to be charged, and the wireless earphone is to be charged by using the charging case. In order to perform charging and communication over one interface, the operation attribute of the first I/O interface includes a communication interface and a charging interface. In a case that the operation attribute of the first I/O interface is set as the communication interface, the first processor communicates with the wireless earphone via the first I/O interface. In a case that the operation attribute of the first I/O interface is set as the charging interface, an earphone case charging module in the charging case charges the wireless earphone via the first I/O interface.

In order to perform the above functions, the earphone case I/O controlling module is connected with the first I/O interface, and is connected with the first processor and the earphone case charging module. Under the control of the first processor, the earphone case I/O controlling module controls the first I/O interface to be connected to the first processor or the earphone case charging module. The earphone case I/O controlling module is a controllable single-pole double-throw switch. The first processor may control the earphone case I/O controlling module by using high and low levels. For example, in a case that the earphone case I/O controlling module receives a high level, the first I/O interface is connected with the earphone case charging module; and in a case that the earphone case I/O controlling module receives a low level, the first I/O interface is connected with the first processor. The implementation and control of the earphone case I/O controlling module are not limited in the present disclosure, which are performed according to actual situations. In addition, the earphone case charging module may be connected to an external power supply. A battery in the charging case is charged via a VBUS interface of USB, and the wireless earphone is charged via a VBUS. The battery in the charging case may charge the wireless earphone through the earphone case charging module.

Specifically, the first processor controls the earphone case I/O controlling module to set the operation attribute of the first I/O interface as the communication interface in response to the case opening signal, that is, the earphone case I/O controlling module controls the first I/O interface to be connected with the first processor. Then, the first processor transmits the predetermined negotiation signal to the wireless earphone via the first I/O interface rather than directly communicating with the wireless earphone, and enters into a monitoring state. In a case that the wireless earphone receives the predetermined negotiation signal, the wireless earphone transmits a negotiation confirmation signal corresponding to the predetermined negotiation signal to the charging case according to a predetermined rule. In a case that the charging case receives the negotiation confirmation signal, it indicates that the communication between the charging case and the wireless earphone is reliable and the charging case and the wireless earphone are ready for communication. Then, the charging case may communicate with the wireless earphone. Based on the communication between the charging case and the wireless earphone, compulsory Bluetooth pairing, earphone power query, case opening/closing notification, OTA upgrade trigger, and the like may be realized.

In addition, in the present disclosure, the predetermined negotiation signal may be set as a first number of square wave signals, and the negotiation confirmation signal may be set as a second number of square wave signals. The first number may be but not limited to four, and the second number may be but not limited to five. The charging case may transmit four square wave signals to the wireless earphone via the first I/O interface. The wireless earphone may acquire the square wave signals by detecting a rising edge and/or a falling edge of an input, and transmits five square wave signals after receiving four square wave signals. The charging case may acquire a square wave signal by detecting a rising edge and/or a falling edge. The charging case, after receiving five square wave signals, enters into the communication mode for communicating with the wireless earphone. Duty cycles and numbers of the square wave signals in the predetermined negotiation signal and the negotiation confirmation signal are not limited in the present disclosure, which are determined according to actual situations. Apparently, the predetermined negotiation signal herein may be other types of signals as long as the present disclosure can be realized. In practices, a single serial port circuit is further arranged between the first processor and the earphone case I/O controlling module to perform the communication between the first processor and the earphone case I/O controlling module in a half-duplex communication mode.

In summary, the method for communicating between a wireless earphone and a charging case is provided according to the present disclosure. With the method according to the present disclosure, an interactive confirmation process is performed before the communication between the charging case and the wireless earphone, thereby improving the reliability of the communication between the charging case and the wireless earphone.

Based on the above embodiments, as a preferred embodiment, before transmitting the predetermined negotiation signal to the wireless earphone via the first I/O interface, the method further includes transmitting an interrupt triggering signal to the wireless earphone via the first I/O interface to trigger the wireless earphone to close interrupt until transmitting the negotiation confirmation signal.

Specifically, in order to improve the stability and reliability of the negotiation confirmation process, in the embodiment, the first processor, before transmitting the predetermined negotiation signal to the wireless earphone via the first I/O interface, transmits the interrupt triggering signal to the wireless earphone via the first I/O interface. After receiving the interrupt triggering signal, the wireless earphone closes interrupt and waits for the predetermined negotiation signal from the charging case. After receiving the predetermined negotiation signal, the wireless earphone transmits the negotiation confirmation signal. Then, the wireless earphone opens interrupt.

In practices, the output of the first I/O interface is a high level during the charging case charges the wireless earphone. Therefore, in order to switch the charging case from the charging mode to the communication mode, the interrupt triggering signal may be set as a low level.

It can be seen that with the method in the embodiment, the wireless earphone only determines information acquired after the interrupt is closed as the predetermined negotiation signal, ensuring the accuracy of the acquired predetermined negotiation signal, and thereby improving the stability and reliability of the negotiation confirmation process.

As a preferred embodiment, after controlling the charging case to enter into in the communication mode for communicating with the wireless earphone, the method further includes the following steps. In response to a case closing signal, a case closing message is transmitted to the wireless earphone via the first I/O interface to control the wireless earphone to enter into the charging mode. The earphone case I/O controlling module is controlled to set the operation attribute of the first I/O interface as a charging interface to control the charging case to enter into the charging mode for charging the wireless earphone.

Specifically, as mentioned in the above embodiments, in the case that the charging case is closed, it indicates that the wireless earphone needs to be charged. After receiving the case closing signal, the first processor transmits the case closing message to the wireless earphone via the first I/O interface to control the wireless earphone to enter into the charging mode. Then, the first processor controls the earphone case I/O controlling module to set the operation attribute of the first I/O interface as a charging interface. The earphone case I/O controlling module controls the first I/O interface to be connected with the earphone case charging module. The earphone case charging module charges the wireless earphone via the first I/O interface, and the charging case enters into the charging mode for charging the wireless earphone. Therefore, an automatic switching from the communication mode to the charging mode is performed in the embodiment, thereby achieving a high automation degree.

As a preferred embodiment, before transmitting the predetermined negotiation signal to the wireless earphone via the first I/O interface, the method further includes the following steps. An interface, arranged in the first processor and used for communicating with the wireless earphone, is switched from a TX port to a GPIO (general-purpose input/output) interface. Before controlling the charging case to enter into the communication mode for communicating with the wireless earphone, the method further includes switching the interface, arranged in the first processor and used for communicating with the wireless earphone, from the GPIO interface to the TX port.

Usually, a few number of A/D (analog to digital) interfaces are arranged on the main control chip (such as a second processor described in the following embodiments) in the wireless earphone. The A/D interfaces are usually configured to be connected with sensors in the wireless earphone, and almost no free A/D interfaces are left. Therefore, in a case that the charging case transmits the predetermined negotiation signal (such as a voltage) via the TX port, it is required for the wireless earphone to determine, based on a voltage after A/D conversion, whether to transmit a negotiation confirmation signal corresponding to the predetermined negotiation signal. If the A/D interfaces on the main control chip in the wireless earphone are not sufficient, it may be required to arrange an AD converter in the wireless earphone, resulting in an increase in the size of the wireless earphone and an increase in the cost. In addition, the TX/RX-based communication software in the charging case is fixed. It is required to modify the TX/RX-based communication software for adding TX/RX-based negotiation software, resulting in inconvenience for subsequent transplantation of the TX/RX-based communication software.

Many GPIO interfaces are arranged on the main control chip in the wireless earphone, and high/low levels are transmitted via the GPIO interface, without occupying the A/D interfaces on the main control chip and without arranging an additional AD converter. In addition, with the GPIO interface, it is only required to configure GPIO-based negotiation software and corresponding hardware in the first processor in advance without modifying the TX/RX-based communication software. Therefore, to solve the above technical problems, before the predetermined negotiation signal is transmitted to the wireless earphone via the first I/O interface in the present disclosure, the first processor switches the interface, which is arranged in the first processor and used for communicating with the wireless earphone, from a TX port to a GPIO interface based on the GPIO-based negotiation software and the corresponding hardware, so that the first processor outputs the predetermined negotiation signal including high/low levels. After the negotiation is confirmed, the interface is switched from the GPIO interface to the TX port before the charging case enters into the communication mode for communicating with the wireless earphone, ensuring the communication between the charging case and the wireless earphone is not affected.

It can be seen that before the negotiation, the first processor outputs the predetermined negotiation signal including high/low levels via the GPIO interface. A second processor (described in the following embodiments) in the wireless earphone receives the predetermined negotiation signal including high/low levels via a third I/O interface (referring to the following embodiments), and determines whether to transmit a negotiation confirmation signal corresponding to the predetermined negotiation signal based on the predetermined negotiation signal including high/low levels. With the method according to the embodiment, only redundant GPIO interface on the second processor is occupied without occupying the A/D interfaces on the main control chip and without arranging an additional AD converter, reducing occupation of space of the wireless earphone and reducing the cost. In addition, it is unnecessary to modify the TX/RX-based communication software in the charging case, facilitating the subsequent transplantation of the TX/RX-based communication software. After the negotiation is confirmed, the first processor communicates with the wireless earphone via a TX interface and a RX interface, without affecting the communication between the charging case and the wireless earphone.

Figure 2:
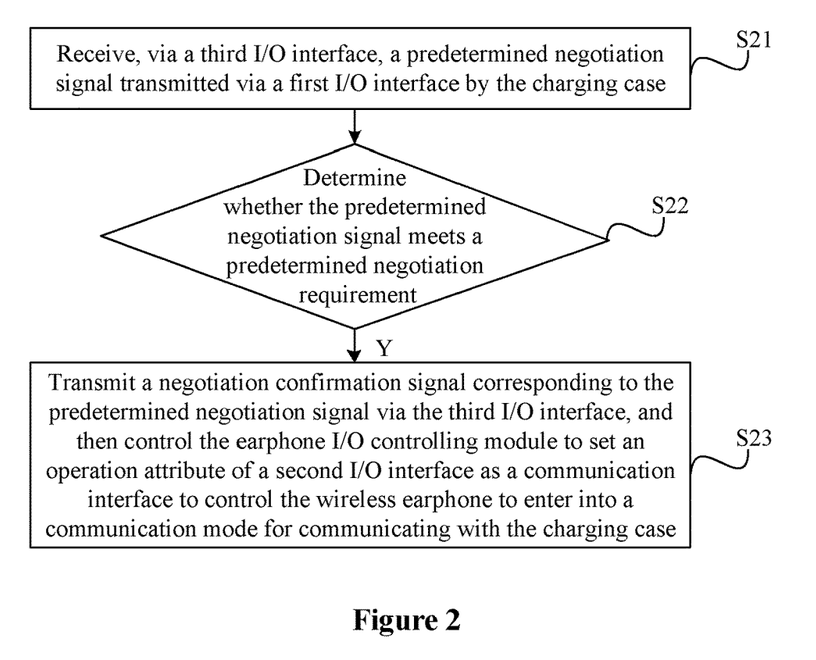
FIG. 2 is a flow chart of a method for communicating between a wireless earphone and a charging case according to another embodiment of the present disclosure.

Reference is made to FIG. 2, which is a flow chart of a method for communicating between a wireless earphone and a charging case according to another embodiment the present disclosure.

The wireless earphone includes a second processor, an earphone I/O controlling module, a second I/O interface, and a third I/O interface connected to the second I/O interface. The method is applied to the second processor. The method includes the following steps S21 to S23.

In step S21, a predetermined negotiation signal transmitted via a first I/O interface by the charging case is received via the third I/O interface.

In step S22, it is determined whether the predetermined negotiation signal meets a predetermined negotiation requirement. In a case that the predetermined negotiation signal meets the predetermined negotiation requirement, proceed to step S23.

In step S23, a negotiation confirmation signal corresponding to the predetermined negotiation signal is transmitted via the third I/O interface, and then the earphone I/O controlling module is controlled to set an operation attribute of the second I/O interface as a communication interface to control the wireless earphone to enter into a communication mode for communicating with the charging case.

It should be noted that the wireless earphone includes the second I/O interface for multiplexing charging and communication, and includes the third I/O interface connected to the second I/O interface. The third I/O interface is configured, before the operation attribute of the second I/O interface is changed from the charging interface to the communication interface, to receive the predetermined negotiation signal transmitted via the first I/O interface by the charging case and an interrupt triggering signal described in the following embodiments, so that the second processor, after determining that the predetermined negotiation signal meets the predetermined negotiation requirement, sets the operation attribute of the second I/O interface from the charging interface to the communication interface.

The operation attribute of the second I/O interface includes a communication interface and a charging interface. In a case that the operation attribute of the second I/O interface is set to the communication interface, the second processor communicates with the charging case via the second I/O interface. In a case that the operation attribute of the second I/O interface is set to the charging interface, the charging case charges the wireless earphone via the second I/O interface.

To perform the above functions, the earphone I/O controlling module is connected with the second I/O interface, and is connected with the second processor and an earphone charging module. Under the control of the second processor, the earphone I/O controlling module controls the second I/O interface to be connected to the second processor or the earphone charging module. The earphone I/O controlling module is a controllable single-pole double-throw switch. The second processor may control the earphone I/O controlling module by using high and low levels. For example, in a case that the earphone I/O controlling module receives a high level, the second I/O interface is connected with the earphone charging module; and in a case that the earphone I/O controlling module receives a low level, the second I/O interface is connected with the second processor. The implementation and control of the earphone I/O controlling module are not limited in the present disclosure, which are performed according to actual situations. The earphone charging module in the charging case may charge a battery in the wireless earphone via a VBUS.

In practices, a single serial port circuit is further arranged between the second processor and the earphone I/O controlling module to perform the communication between the second processor and the earphone I/O controlling module in a half-duplex communication mode.

As a preferred embodiment, before receiving, via the third I/O interface, the predetermined negotiation signal transmitted by the charging case via the third I/O interface, the method further includes the following steps. An interrupt triggering signal is received via the third I/O interface from the charging case. Interrupt is closed until transmitting the negotiation confirmation signal.

As a preferred embodiment, after the wireless earphone enters into the communication mode for communicating with the charging case, the method further includes the following steps. A case closing message is received via the second I/O interface from the charging case. The earphone I/O controlling module is controlled to set the operation attribute of the second I/O interface as the charging interface to control the wireless earphone to enter into a charging mode.

Specifically, according to the above embodiments, in a case that the second processor receives a case closing message from the charging case, it indicates that the wireless earphone needs to be charged currently. After receiving the case closing message, the second processor controls the earphone I/O controlling module to set the operation attribute of the second I/O interface as the charging interface. The earphone I/O controlling module controls the second I/O interface to connect with the earphone charging module. The charging case charges the wireless earphone via the second I/O interface. Therefore, the automatic switching from the communication mode to the charging mode is performed in the embodiment, thereby achieving a high automation degree.

As a preferred embodiment, the third I/O interface is a GPIO interface.

In the embodiment, the third I/O interface is configured to receive a predetermined negotiation signal including high/low levels.

The method for communicating between a wireless earphone and a charging case in the charging case side is fully described. For the description of the method for communicating between a wireless earphone and a charging case in the wireless earphone side according to the present disclosure, one may refer to the embodiments of the method in the charging case side, which is not repeated herein.

Figure 3:
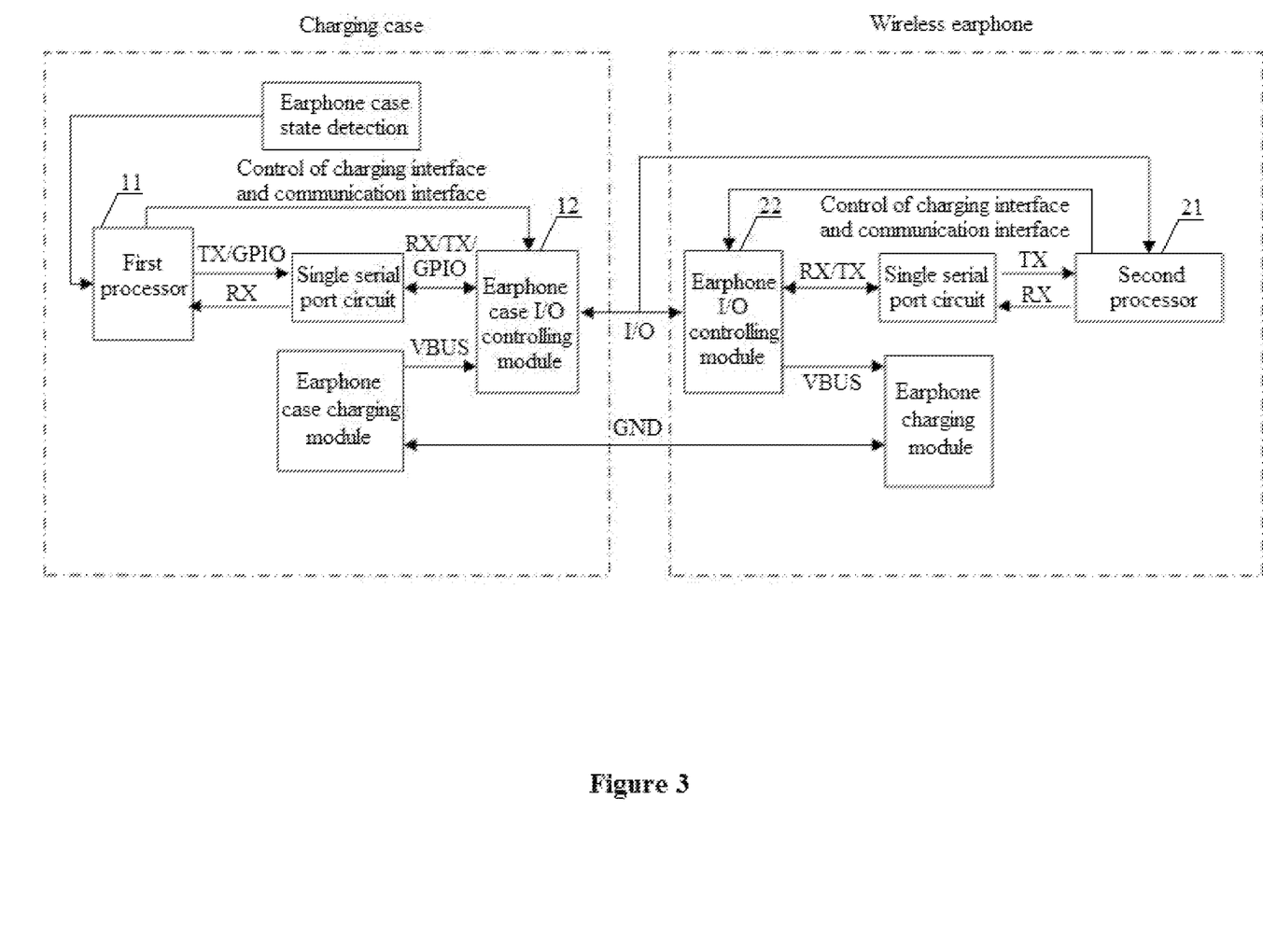
FIG. 3 is a schematic structural diagram of a TWS earphone system according to the present disclosure.

Reference is made to FIG. 3, which is a schematic structural diagram of a TWS earphone system according to the present disclosure.

A charging case is further provided according to the present disclosure. The charging case includes a first processor 11, an earphone case I/O controlling module 12 and a first I/O interface. The first processor 11 is configured to execute a computer program to perform the method for communicating between a wireless earphone and a charging case.

FIG. 3 shows the structure of the charging case according to the present disclosure.

A TWS earphone is further provided according to the present disclosure. The TWS earphone includes a second processor 21, an earphone I/O controlling module 22, a second I/O interface, and a third I/O interface connected to the second I/O interface. The second processor 21 is configured to execute a computer program to perform the method for communicating between a wireless earphone and a charging case. FIG. 3 shows the structure of the TWS earphone according to the present disclosure.

It should be noted that the TWS earphones includes a master earphone and a slave earphone. Each of the master earphone and/or the slave earphone includes a second processor 21, an earphone I/O controlling module 22, a second I/O interface, a third I/O interface connected to the second I/O interface, and a second processor.

A TWS earphone system is further provided according to the present disclosure. The TWS earphone system includes the charging case and the TWS earphone.

For the description of the charging case, the TWS earphone and the TWS earphone system, one may refer to the method embodiments described above, which is not repeated in the present disclosure.

It should be noted that in this specification, the relationship terminologies such as first, second and the like are only used herein to distinguish one entity or operation from another, rather than to necessitate or imply that the actual relationship or order exists between the entities or operations. Moreover, terms of "include", "comprise" or any other variants are intended to be non-exclusive. Therefore, a process, method, article or device including multiple elements includes not only the elements but also other elements that are not enumerated, or also includes the elements inherent to the process, method, article or device. Unless expressively limited otherwise, the statement "comprising (including) one . . . " does not exclude the case that other similar elements may exist in the process, method, article or device.

Embodiments of the disclosure are described above, so that those skilled in the art can implement or use the present disclosure. Various modifications to the embodiments are apparent to those skilled in the art, and general principles defined in this specification may be implemented in other embodiments without departing from the spirit or scope of the present disclosure. Therefore, the present disclosure is not to be limited to the embodiments described in this specification, but accords with the widest scope consistent with the principles and novel features disclosed in this specification.

The invention claimed is:

1. A method for communicating between a wireless earphone and a charging case, wherein the charging case comprises a first processor, an earphone case I/O controlling module and a first I/O interface, the method is applied to the first processor, and the method comprises:
controlling, in response to a case open signal, the earphone case I/O controlling module to set an operation attribute of the first I/O interface as a communication interface;
transmitting a predetermined negotiation signal to the wireless earphone via the first I/O interface;
determining whether a negotiation confirmation signal corresponding to the predetermined negotiation signal is received from the wireless earphone via the first I/O interface; and
controlling the charging case to enter into a communication mode for communicating with the wireless earphone in a case that the negotiation confirmation signal corresponding to the predetermined negotiation signal is received from the wireless earphone via the first I/O interface.

2. The method for communicating between a wireless earphone and a charging case according to claim 1, wherein before transmitting the predetermined negotiation signal to the wireless earphone via the first I/O interface, the method further comprises:
transmitting an interrupt triggering signal to the wireless earphone via the first I/O interface to trigger the wireless earphone to close interrupt until transmitting the negotiation confirmation signal.

3. The method for communicating between a wireless earphone and a charging case according to claim 1, wherein after controlling the charging case to enter into the communication mode for communicating with the wireless earphone, the method further comprises:
transmitting, in response to a case close signal, a case close message to the wireless earphone via the first I/O interface to control the wireless earphone to enter into a charging mode; and
controlling the earphone case I/O controlling module to set the operation attribute of the first I/O interface as a charging interface to control the charging case to enter into the charging mode for charging the wireless earphone.

4. The method for communicating between a wireless earphone and a charging case according to claim 1, wherein before transmitting the predetermined negotiation signal to the wireless earphone via the first I/O interface, the method further comprises:
switching an interface, arranged in the first processor and used for communicating with the wireless earphone, from a TX port to a general-purpose input/output (GPIO) interface; and
before controlling the charging case to enter into the communication mode for communicating with the wireless earphone, the method further comprises:
switching the interface, arranged in the first processor and used for communicating with the wireless earphone, from the GPIO interface to the TX port.

5. A method for communicating between a wireless earphone and a charging case, wherein the wireless earphone comprises a second processor, an earphone I/O controlling module, a second I/O interface, and a third I/O interface connected to the second I/O interface, the method is applied to the second processor, and the method comprises:
receiving, via the third I/O interface, a predetermined negotiation signal transmitted by the charging case via a first I/O interface;
determining whether the predetermined negotiation signal meets a predetermined negotiation requirement; and
in a case that the predetermined negotiation signal meets the predetermined negotiation requirement, transmitting a negotiation confirmation signal corresponding to the predetermined negotiation signal via the third I/O interface, and then controlling the earphone I/O controlling module to set an operation attribute of the second I/O interface as a communication interface to control the wireless earphone to enter into a communication mode for communicating with the charging case.

6. The method for communicating between a wireless earphone and a charging case according to claim 5, wherein before receiving, via the third I/O interface, the predetermined negotiation signal transmitted by the charging case via the first I/O interface, the method further comprises:
receiving an interrupt triggering signal via the third I/O interface from the charging case; and
closing interrupt until transmitting the negotiation confirmation signal.

7. The method for communicating between a wireless earphone and a charging case according to claim 6, wherein after controlling the wireless earphone to enter into the communication mode for communicating with the charging case, the method further comprises:
receiving a case closing message via the second I/O interface from the charging case; and
controlling the earphone I/O controlling module to set the operation attribute of the second I/O interface as a charging interface to control the wireless earphone to enter into a charging mode.

8. A charging case, comprising a first processor, an earphone case I/O controlling module and a first I/O interface, wherein the first processor is configured to execute a computer program to perform the method for communicating between a wireless earphone and a charging case according to claim 1.

9. A TWS earphone, comprising a second processor, an earphone I/O controlling module, a second I/O interface, and a third I/O interface connected to the second I/O interface, wherein
the second processor is configured to execute a computer program to perform the method for communicating between a wireless earphone and a charging case according to claim 5.

10. A TWS earphone system, comprising a charging case and a TWS earphone, wherein
the charging case comprises a first processor, an earphone case I/O controlling module and a first I/O interface, and the first processor is configured to execute a computer program to perform:
controlling, in response to a case opening signal, the earphone case I/O controlling module to set an operation attribute of the first I/O interface as a communication interface;
transmitting a predetermined negotiation signal to the wireless earphone via the first I/O interface;

determining whether a negotiation confirmation signal corresponding to the predetermined negotiation signal is received from the wireless earphone via the first I/O interface; and controlling the charging case to enter into a communication mode for communicating with the wireless earphone in a case that the negotiation confirmation signal corresponding to the predetermined negotiation signal is received from the wireless earphone via the first I/O interface; and the TWS earphone comprises a second processor, an earphone I/O controlling module, a second I/O interface, and a third I/O interface connected to the second I/O interface, and the second processor is configured to execute a computer program to perform:

receiving, via the third I/O interface, a predetermined negotiation signal transmitted via a first I/O interface by the charging case;

determining whether the predetermined negotiation signal meets a predetermined negotiation requirement; and in a case that the predetermined negotiation signal meets the predetermined negotiation requirement, transmitting a negotiation confirmation signal corresponding to the predetermined negotiation signal via the third I/O interface, and then controlling the earphone I/O controlling module to set an operation attribute of the second I/O interface as a communication interface to control the wireless earphone to enter into a communication mode for communicating with the charging case.

* * * * *